(No Model.)

J. LYALL.
MACHINE FOR CUTTING METAL OVALS.

No. 324,331. Patented Aug. 11, 1885.

Witnesses:
Henry Bossert.
James F. Tobin.

Inventor
John Lyall
by his Attorneys
Hulson & Sons

United States Patent Office.

JOHN LYALL, OF GOVAN, COUNTY OF LANARK, SCOTLAND.

MACHINE FOR CUTTING METAL OVALS.

SPECIFICATION forming part of Letters Patent No. 324,331, dated August 11, 1885.

Application filed February 2, 1885. (No model.) Patented in England April 19, 1884, No. 6,574; in France January 20, 1885, No. 166,543, and in Germany January 24, 1885, No. 32,161.

*To all whom it may concern:*

Be it known that I, JOHN LYALL, residing at Govan, in the county of Lanark, Scotland, and a subject of the Queen of Great Britain and Ireland, have invented certain Improved Apparatus for Cutting Oval Holes in Metal Plates, of which the following is a specification.

My invention relates to improved apparatus for cutting oval holes in metal plates—such, for example, as the man-hole and mud-hole doorways of steam-boilers.

Figure 1:
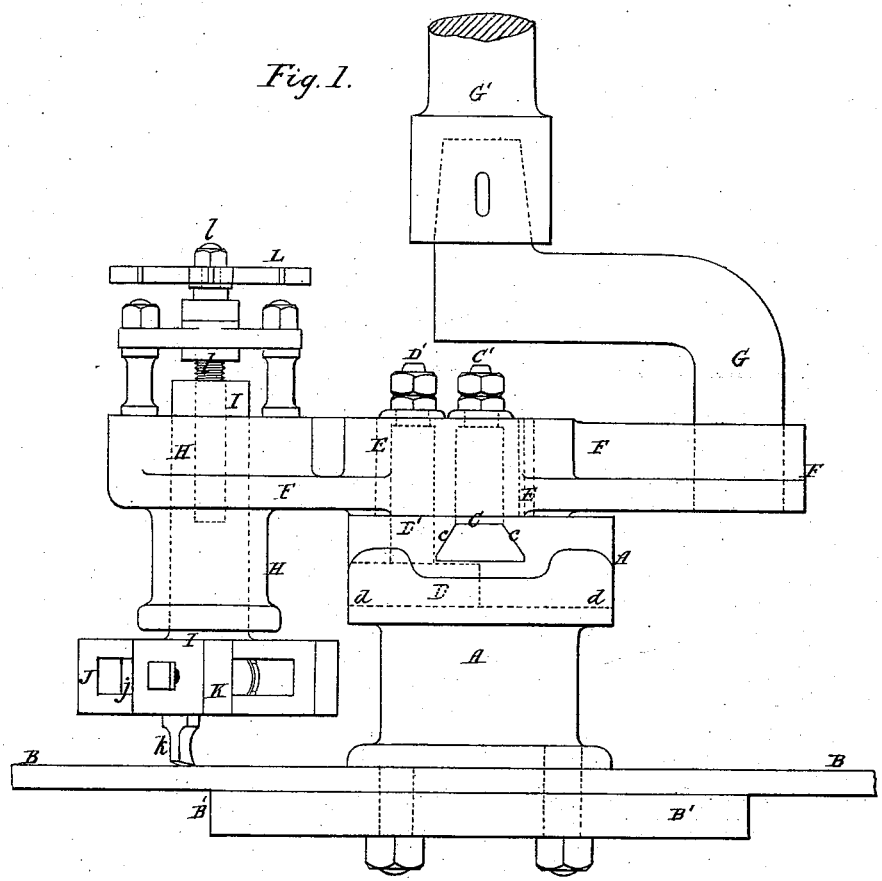
Figure 2:
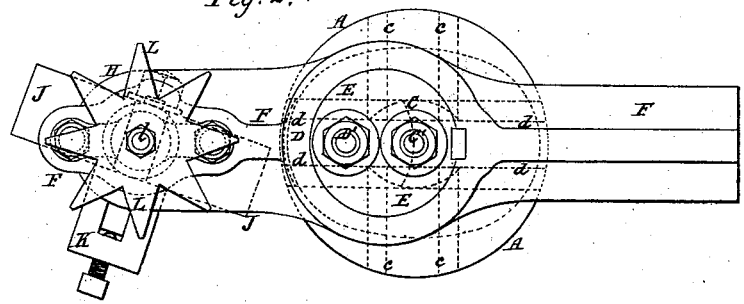

The invention is illustrated in the accompanying drawings, in which Figure 1 is an elevation, and Fig. 2 is a plan, of a modification of my improved apparatus for cutting oval holes.

The improved apparatus comprises a head or center block, A, which is bolted or otherwise secured to the plate B, in which the oval hole is to be cut. In the upper side of this head or block are cut two grooves, $c$ and $d$, formed of inverted V or T shape, and crossing each other centrally at right angles. The grooves $c$ $d$ may be in the same plane; but are by preference formed so that the upper surface of the one is in the plane of the bottom surface of the other, so that the slides C and D, with which they are fitted, may freely cross each other. One slide is fitted within each groove, and may be made in the form of a bolt-head, C or D, corresponding in shape to the section of the groove $c$ or $d$, and formed or fitted with a pin or bolt, $c'$ or $d'$, passing out perpendicular to the groove through a bush, E, fitted to slide and turn freely on the upper side of the head A, the bush being secured to the head by nuts $e$, or equivalent fastenings, on the ends of the bolts C' D'. This bush E is fixed to or formed on an arm, F, extending out laterally on both sides from the head, and this arm is fitted with a handle or crank-pin, by means of which it is rotated, or it is operated by a driving-arm, G, on the spindle G', of a vertical boring-machine, the plate being secured between the head A and the table B' of the vertical. By the rotation of the bush E the slides C D are traversed back and forth in their grooves $c$ $d$, and they constrain the motion of the bush and arm, so that the path traversed by any point in the arm F is that of an ellipse or oval. If a cutting-tool be fixed in the arm F perpendicular to the plate to which the head is fixed, it may be made to cut out an oval opening in the plate round the head A as a center, and the major and minor axes of the oval will depend on the distance apart of the centers of the slides or bolts C' D'. On one end of the cross-arm F is formed a boss, H, which carries a spindle, I, fitted with a radial slotted arm, J, in which a tool-holder, K, is secured. The tool-holder K is adjustable radially in the slot $j$, so that it may be moved out from or toward the center, to regulate the size of hole which is to be cut by the tool $k$ carried in the tool-holder. The tool $k$ is fed forward in a line perpendicular to the plate B to be cut, by means of a screw, $l$, which acts on the spindle I, carrying the slotted arm J and tool-holder K, and which is turned by a hand-wheel or by a star-wheel, L, or similar device acted on at each revolution by a fixed stop. The tool $k$ cuts a groove in the plate B, and this groove is deepened as the tool is fed forward until the plate is cut through.

By providing several sets of interchangeable bushes E, bored with the holes to fit over the slide-bolts C' D' at different distances apart, the relative lengths of the major and minor axes of the oval may be varied.

The apparatus may be driven, as indicated, from a vertical boring-machine, or from a lathe or similar machine arranged to act on the arm F, which rotates the bush; or it may be operated by hand, in which latter case I prefer to secure on the head A a bracket carrying a train of wheels through which the motion of a hand-crank is imparted to the arm F, the object of the gearing being to increase the power.

What I claim is—

The combination of the tool-carrying arm F, bush E, bolts or slides C D, and grooved center-block, A, substantially as and for the purpose set forth.

In testimony whereof I have signed my name to this specification in the presence of two subscribing witnesses.

JOHN LYALL.

Witnesses:
   W. R. M. THOMSON,
   WALLACE FAIRWEATHER.